United States Patent
Fulton et al.

(10) Patent No.: US 7,888,896 B2
(45) Date of Patent: Feb. 15, 2011

(54) OPERATING ELECTRICAL MACHINES FROM A DC LINK

(75) Inventors: Norman Neilson Fulton, Harrogate (GB); Peter Richard Mayes, Bradford (GB)

(73) Assignee: Switched Reluctance Drives Limited, North Yorkshire (GB)

( * ) Notice: Subject to any disclaimer, the term of this patent is extended or adjusted under 35 U.S.C. 154(b) by 0 days.

(21) Appl. No.: 12/769,264

(22) Filed: Apr. 28, 2010

(65) Prior Publication Data

US 2010/0211231 A1  Aug. 19, 2010

Related U.S. Application Data

(63) Continuation of application No. 11/900,876, filed on Sep. 13, 2007, now Pat. No. 7,737,646.

(30) Foreign Application Priority Data

Sep. 22, 2006  (GB) .................... 0618751.2

(51) Int. Cl.
*H02P 1/00* (2006.01)

(52) U.S. Cl. ................................ 318/139; 318/140

(58) Field of Classification Search ........... 318/569, 318/600, 139, 140, 98, 99
See application file for complete search history.

(56) References Cited

U.S. PATENT DOCUMENTS

| | | | |
|---|---|---|---|
| 4,263,535 A | 4/1981 | Jones | |
| 5,012,177 A | 4/1991 | Dhyanchand et al. | |
| 5,568,073 A | 10/1996 | McClure | |
| 5,850,133 A * | 12/1998 | Heglund | 318/700 |
| 5,936,386 A * | 8/1999 | Heglund | 322/94 |
| 6,333,620 B1 | 12/2001 | Schmitz et al. | |
| 6,661,206 B2 * | 12/2003 | Gallegos-Lopez | 322/23 |
| 7,164,253 B2 | 1/2007 | Sato et al. | |
| 2004/0027105 A1 | 2/2004 | Nakamura et al. | |
| 2004/0135437 A1 | 7/2004 | Mohr et al. | |
| 2005/0105897 A1 | 5/2005 | Wu et al. | |
| 2005/0263331 A1 | 12/2005 | Sopko et al. | |

FOREIGN PATENT DOCUMENTS

DE  32 23 786 A1  12/1983

(Continued)

OTHER PUBLICATIONS

Miller, TJE, "Electronic Control of Switched Reluctance Machines," Newnes, Power Engineering Series, Great Britain, 2001, 2 title pages and pp. 92-97.

(Continued)

*Primary Examiner*—Rina I Duda
(74) *Attorney, Agent, or Firm*—Haynes and Boone, LLP

(57) ABSTRACT

A drive system has a number of electrical machines. One machine operates as a generator supplying an output to a DC link, which in turn supplies one or more machines operating as motors to drive loads. The motors are supplied through power converters. The total capacitance of the DC link is minimized and the link kept in a stable condition by preventing it falling to a hazardous level. One embodiment prevents the phase currents adding in such a manner as to reduce the DC link voltage. Another embodiment employs freewheeling in the phase currents to prevent the DC link voltage falling below a predetermined threshold.

12 Claims, 11 Drawing Sheets

FOREIGN PATENT DOCUMENTS

| | | |
|---|---|---|
| EP | 0 752 753 A2 | 1/1997 |
| EP | 0 982 194 A2 | 3/2000 |
| WO | WO 2006/098703 A1 | 9/2006 |

OTHER PUBLICATIONS

Stephenson, et al., "The Characteristics, Design and Applications of Switched Reluctance Motors and Drives," PCIM '93 Conference & Exhibition, Nürnberg, Germany, Jun. 21-24, 1993, Title page and pp. 1-31 and 33-68.

Radun, et al., "Generating With the Switched Reluctance Motor," IEEE, 1994, pp. 41-47.

Partial European Search Report mailed Dec. 21, 2007 by the European Patent Office in European Patent Applicatoni No. 07253759.0-2207, 5 pages.

Extended European Search Report mailed Feb. 18, 2008 by the European Patent Office in European Patent Application No. 07253759.0-2207, 11 pages.

* cited by examiner

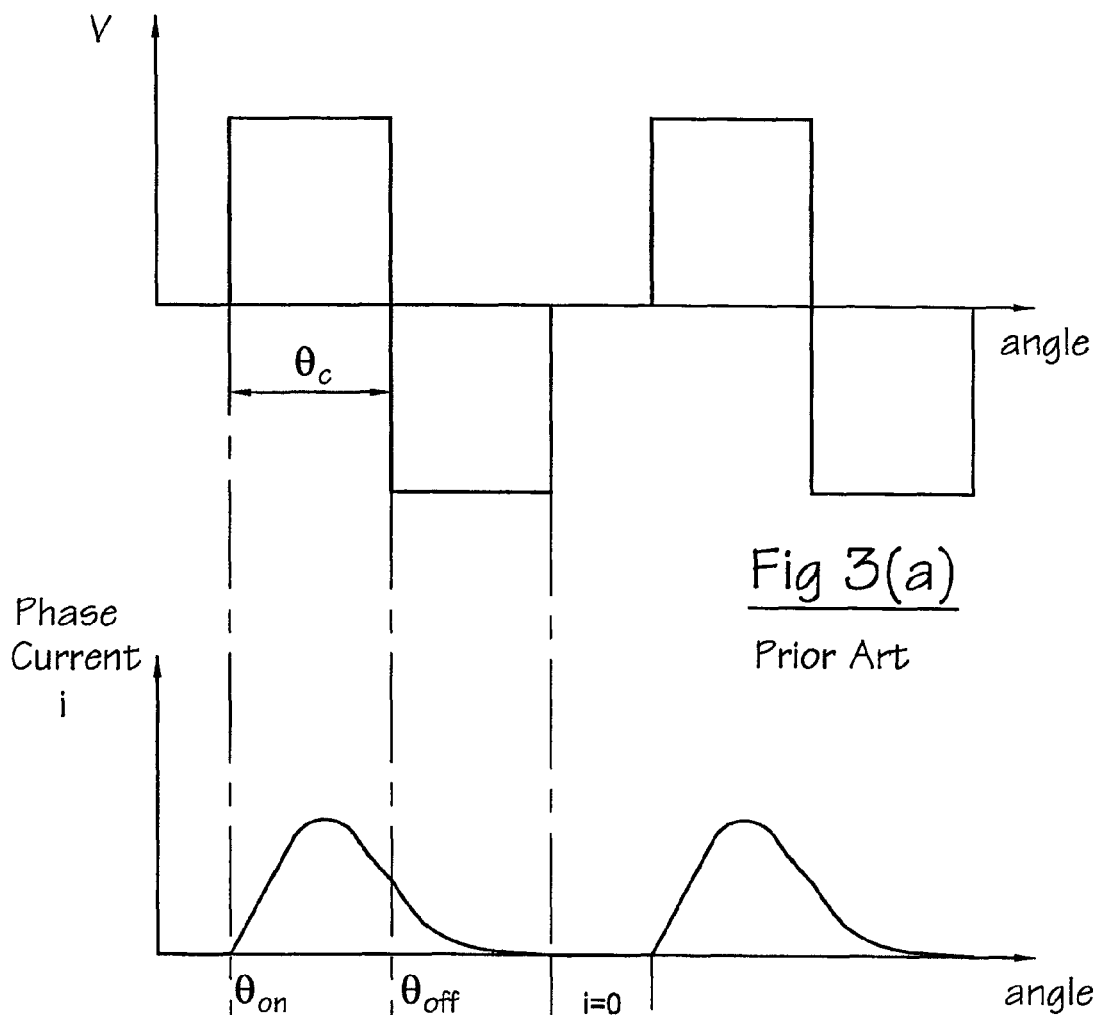
Fig 3(a)
Prior Art
Fig 3(b)
Prior Art
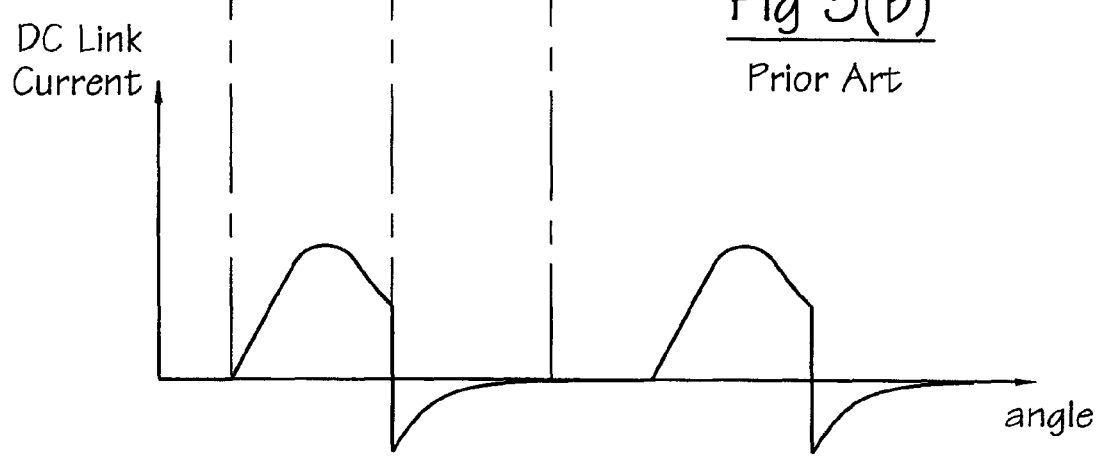
Fig 3(c)
Prior Art

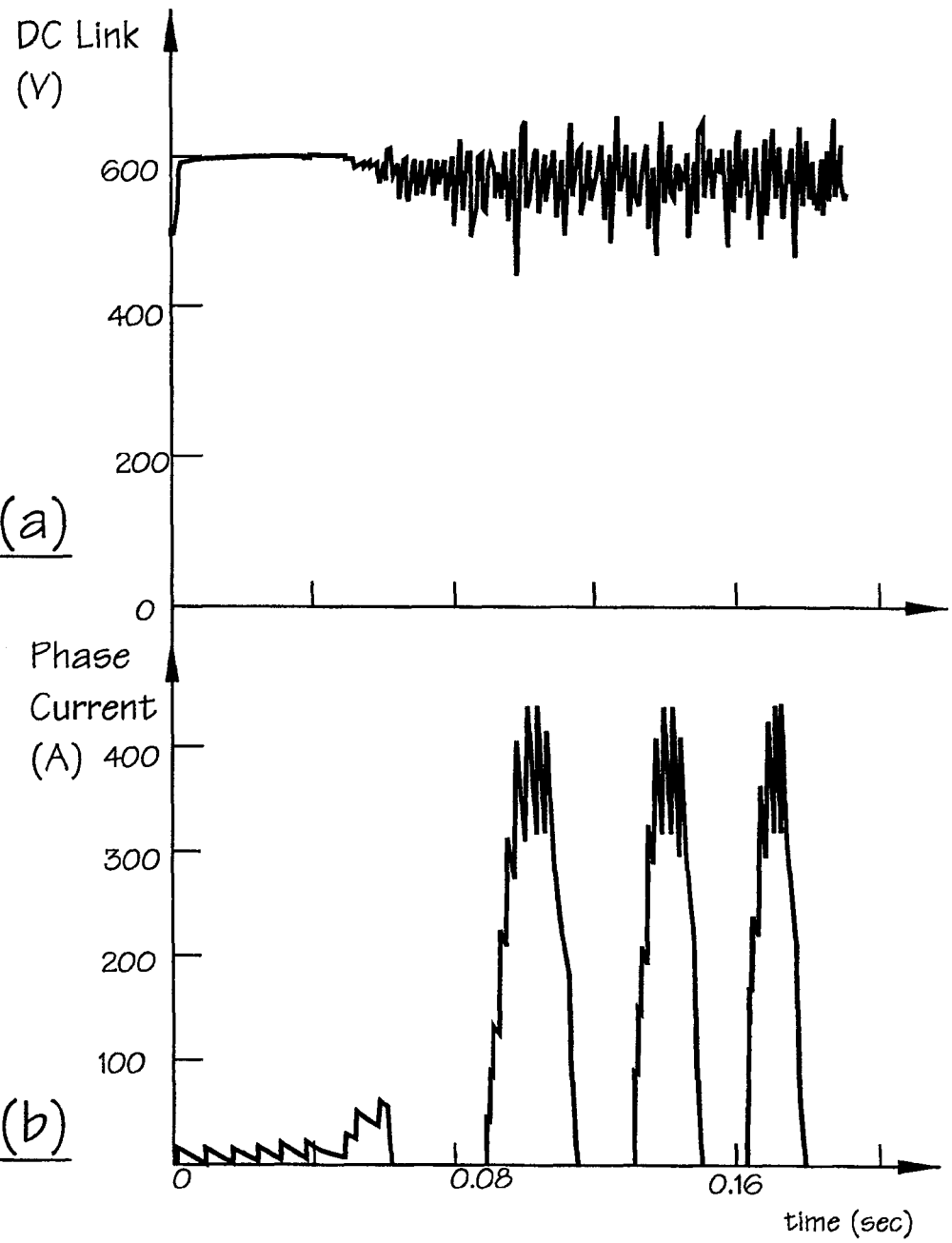

OPERATING ELECTRICAL MACHINES FROM A DC LINK

This application is a continuation of U.S. Ser. No. 11/900,876 filed on Sep. 13, 2007, which claims the priority of Great Britain patent application number GB 0618751.2 filed Sep. 22, 2006.

The present invention generally relates to a system and method for operating a plurality of electrical machines from a DC link. More particularly, though not exclusively, the present invention relates to the stability of such a DC link on which electronically switched machines are required to operate together.

One example of such switched machines is the switched reluctance machine. A general treatment of electrical drives which incorporate switched reluctance machines can be found in various textbooks, e.g. "Electronic Control of Switched Reluctance Machines" by T J E Miller, Newnes, 2001, incorporated herein by reference. More detail is provided in the paper "The characteristics, design and application of switched reluctance motors and drives" by Stephenson and Blake, PCIM'93, Nürnberg, 21-24 Jun. 1993, incorporated herein by reference.

FIG. 1 of the accompanying drawings shows a typical switched reluctance drive in schematic form, where the switched reluctance machine 12 is connected to a load 19. The DC power supply 11 can be either a battery or rectified and filtered AC mains or some other form of energy storage. The DC voltage provided by the power supply 11 is switched across the phase windings 16 of the machine 12 by a power converter 13 under the control of the electronic control unit 14. The switching must be correctly synchronized to the angle of rotation of the rotor for proper operation of the drive, and a rotor position detector 15 is typically employed to supply signals corresponding to the angular position of the rotor. The rotor position detector 15 may take many forms, including that of a software algorithm, and its output may also be used to generate a speed feedback signal. The presence of the position detector and the use of an excitation strategy which is completely dependent on the instantaneous position of the rotor leads to the generic description of "rotor position switched" for these machines.

Many different power converter topologies are known for this type of machine, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively known as the "DC link" of the converter. Energy recovery diodes 23 and 24 are connected to the winding to allow the winding current to flow back to the DC link when the switches 21 and 22 are opened. A low-value resistor 28 may be connected in series with the lower switch to act as a current-sense resistor. A capacitor 25, known as the "DC link capacitor", is connected across the DC link to source or sink any alternating component of the DC link current (ie the so-called "ripple current") which cannot be drawn from, or returned to, the supply. In practical terms, the capacitor 25 may comprise several capacitors connected in series and/or parallel and, where parallel connection is used, some of the elements may be distributed throughout the converter.

FIG. 3 shows typical waveforms for an operating cycle of the circuit shown in FIG. 2 when the machine is in the motoring mode. FIG. 3(a) shows the voltage being applied at the "on angle" ($\theta_{on}$) for the duration of the conduction angle $\theta_c$ when the switches 21 and 22 are closed. FIG. 3(b) shows the current in the phase winding 16 rising to a peak and then falling. At the end of the conduction period, the "off angle" ($\theta_{off}$) is reached, the switches are opened and the current transfers to the diodes, placing the inverted link voltage across the winding and hence forcing down the flux and the current to zero. At zero current, the diodes cease to conduct and the circuit is inactive until the start of a subsequent conduction period. The current on the DC link reverses when the switches are opened, as shown in FIG. 3(c), and the returned current represents energy being returned to the supply. The shape of the current waveform varies depending on the operating point of the machine and on the switching strategy adopted. As is well-known and described in, for example, the Stephenson paper cited above, low-speed operation generally involves the use of current chopping to contain the peak currents, and switching off the switches non-simultaneously gives an operating mode generally known as "freewheeling".

As is well known in the art, switched reluctance machines can be operated in the generating mode, in which the phase currents are mirror images (in time) of the motoring currents. Such systems are discussed in, for example, "Generating with the switched reluctance motor", Radun, Proceedings of the IEEE 9th Applied Power Electronics Conference, Orlando, Fla., 13-17 Feb. 1994, pp 41-47, incorporated herein by reference. FIG. 4(a) illustrates a current waveform when the system is motoring and FIG. 4(b) illustrates the corresponding current waveform for generating. It will be seen from FIG. 4(b) that the machine requires a "priming" or magnetizing flux to be established (along with the necessary current to support this flux) before the larger current is returned to the DC link. In other words, some electrical energy is required from the DC link to prime the machine before it is able to convert the larger amount of mechanical energy back to the DC link. Part of the function of the DC link capacitor is to supply the ripple component of this current.

The waveforms shown in FIGS. 3 and 4 are of the "single-pulse" type, usually associated with high speed operation. Chopping waveforms are shown in FIGS. 5 and 6 for motoring operation. FIG. 5(a) shows a phase current waveform where the conduction period begins in the centre of the minimum inductance region and ends at the centre of the maximum inductance region. During the conduction period, a suitable current controller maintains the current in a hysteresis band defined by $I_u$ and $I_l$. When the upper current $I_u$ is reached, the controller opens both switches and the current and flux fall under the action of the reverse voltage until the lower current $I_l$ is reached, whereupon the chopping cycle begins again. The phase current of FIG. 5(a) corresponds to the supply current of FIG. 5(b), where it will be seen that the ripple current is high, with spikes of returned current each time the top of the hysteresis band is reached.

The effect of introducing freewheeling into this chopping regime is shown in FIG. 6(a), where only one switch is opened when the upper current limit is reached. The rate of flux decay, and hence current decay is now much less, so the chopping frequency is reduced. Current is only returned to the supply at the end of the conduction period, when both switches are opened. This reduction in the ripple current associated with the supply current allows a reduction in the size of the DC link capacitor, and is often one of the main factors in deciding to use a freewheeling strategy of this type. Of course, the peak current drawn from the link at $\theta_{on}$ is unchanged, so any reduction in capacitor size will lead to an increase in the voltage dip in the bus at $\theta_{on}$. With a single drive operating on its own DC link, this increased voltage ripple is generally of little consequence and is tolerated for the sake of the cost saving in capacitor size.

The voltage ripple on the DC link can be significant, however, when two or more drive systems are operated together. For example, FIG. 7 shows a system where a prime mover 70 (e.g. an internal combustion engine) is mechanically coupled to and drives a switched reluctance machine 72 which operates in generating mode. The generator has its own power converter 74 and control electronics 75. The output of this generator appears on the DC bus 76 and is supplied to the power converter 77 of a second switched reluctance machine 78 which has a controller 79 and operates as a motor driving a load 80. Such a system could be found in, e.g., a marine application or in a hybrid electric vehicle. The DC link capacitor 82 is effectively the capacitor serving both power converters 74 and 77, though in practice it would be distributed between the converters in order to suppress transient effects associated with self-inductance of the layout of the components. The motoring and generating systems are now linked by a common DC bus, so features in the electrical waveform imposed on the bus by one system will be experienced by the other.

It will be appreciated that there is no requirement for the machines to operate at the same speed. The speed of the motor 78 will be a function of the load 80 and the performance demanded by the user. The speed of the generator 72 is determined by the prime mover 70. The speed of the prime mover is determined by the system designer, who can program the speed and torque so as to most efficiently provide the power required by the load 80. Thus the speeds of the generator and the motor are not linked in any simple way.

As described above, the generator draws its excitation from the DC bus at the beginning of each cycle of phase conduction. In order to generate the required output, the flux in the machine must reach the appropriate level before the switches open and energy return begins. Since the flux is the integral over time of the applied voltage, the exact level of DC link voltage at the moment of excitation is now important for correct operation of the generator. If the voltage dips because a phase of the motor has just been switched on and the DC link capacitor is unable to supply sufficient energy to maintain the link voltage, the excitation of the generator will be less than expected and the output from the generator in the second part of the cycle will be correspondingly less. This may lead to a longer depression of the DC link voltage, requiring the control system 75 of the generator to intervene and adjust the conduction angles to restore the output of the generator. There is clearly the potential for an instability to set in, requiring care in the design of the parameters of the control system, particularly the bandwidth, and in sizing the DC link capacitor.

Since the two machines are not in any way linked in terms of the frequency of one with respect to the other (i.e. they are 'frequency wild'), it is very difficult to test every combination of machine speeds and loads to ascertain correct system performance.

While the system is generally tolerant of small perturbations, aided by the energy stored by virtue of the inertia of the rotating parts, there are situations where the disturbance can be high on random occasions. For example, in the excitation pattern frequently used in high-output motors, two or more phases can have their conduction periods overlapping. The chopping action in these phases is effectively frequency wild, since the frequency will change through the conduction period. This additional pattern is superimposed on the existing complex voltage appearing on the DC link. If two phases are switched on together, there will be a much larger voltage dip on the DC link as energy is drawn from the DC link capacitor. This problem is magnified in arrangements where the generator feeds a plurality of drives, e.g. as shown in FIG. 8. In FIG. 8, the DC link now supplies a series of converters 77a, 77b, 77c which serve motors 78a, 78b, 78c driving loads 80a, 80b, 80c. Unless these loads are mechanically linked, the motors will be frequency wild with respect to each other, so there is now a random chance of coincidence of a large number of phases being switched onto the DC link simultaneously. In this event, the voltage on the DC link will exhibit a severe dip and the generator may fail to receive any significant amount of excitation from the link when it next requires it. The DC link voltage will therefore collapse and the system will stall. This is extremely serious in many applications, especially where the loads are safety critical.

The only prior art solution to this problem is to add more and more capacitance to the DC link to support the voltage and suppress the voltage ripple. This has drawbacks. Firstly, the extra capacitance is costly to install, and needs extra space to house it. In many applications, space is not available and, in any case, the extra cost is unwelcome. Such capacitors have a finite life, unlike most other parts of the drive system, so the capacitors need to be renewed on a regular basis to maintain the integrity of the drive, and this represents a further cost associated with maintaining the drive. Secondly, the increased capacitance is now distributed among the generator and traction drives, linked by cables that have significant self-inductance. This introduces the likelihood of parasitic oscillations being generated on the DC link, which can themselves produce damaging effects and can lead to shut down of the drive.

There is therefore a need for a method of controlling the voltage ripple on the DC link to address this potential instability. In accordance with embodiments of the present invention, the foregoing disadvantages of known drive systems are overcome in a reliable and cost-effective manner.

The present invention is defined in the accompanying independent claims. Preferred features of the invention are recited in the claims respectively dependent thereon.

Embodiments of the present invention generally relate to a method and system of operating a plurality of electrical machines from a DC link, comprising controlling the current in at least one phase winding in at least one of the electrical machines to control disturbances in the DC link voltage caused by the combined load of the plurality of electrical machines.

In one particular form there is provided a system for controlling a plurality of electrical machines from a DC link, comprising a power converter including a DC link to which the electrical machines are connected, and means for operating the power converter to control the magnitude of disturbances in the DC link voltage caused by the combined load of the electrical machines.

By the above control, the magnitude of disturbances in the DC link voltage are reduced such that excursions in the ripple of the voltage on the DC link can be kept within an acceptable limit.

Typically the current in an electrical machine is controlled by chopping to a predetermined threshold level. The invention can be implemented using current chopping or any other current control technique. For example, the phase current profile can be modified to reduce current demand. This may be implemented with reference to the angle of the rotor of the electrical machine with respect to the stator. One particular way of achieving this is to gradually increase the current level when each phase becomes active. For example, in a chopping mode of control the chopping level may be gradually increased over a conduction period rather than resorting to the maximum chopping level at the start of the period. Thus, the chopping level in a conduction period can be made variable with time or rotor position.

The control of the ripple in the DC link voltage can be enabled at all times to reduce the current demand on the DC link, or it can be enabled only when a potential failure of the system is present. By means of the latter approach, only when the demand on the DC link reduces the DC link voltage to a predetermined threshold will modification of the phase current take effect, thereby maintaining a higher power output at other times.

As an alternative to introducing a gradient into the application of phase current (for example by means of the variable chopping level) other ways of reducing current demand on the DC link include freewheeling the phase current in the event of a potential failure or reducing phase current to zero for a portion of the period when the phase would otherwise be active, thereby returning energy to the DC link. Thus, freewheeling or energy return can be carried out to avoid the problem of DC link failure and stalling of the machine. Such modification of the current in a particular phase may be carried out at the start of a conduction period.

Another way of reducing current demand from the DC link is to delay activation of energization of a phase. This may be achieved by delaying the onset of conduction.

To avoid control 'chatter', hysteresis can be used in the modification of the phase current.

Other aspects and advantages of the invention will become apparent upon reading the following detailed description of exemplary embodiments of the invention and upon reference to the accompanying drawings, in which:

FIG. 3(*a*) is a phase voltage waveform for the circuit shown in FIG. 2;

FIG. 3(*b*) is the phase current waveform corresponding to FIG. 3(*a*);

FIG. 3(*c*) is the supply current waveform corresponding to FIG. 3(*a*);

FIG. 4(*b*) shows a prior art generating current waveform;

FIG. 5(*b*) shows the supply current corresponding to FIG. 5(*a*);

FIG. 6(*b*) shows the supply current corresponding to FIG. 6(*a*);

FIG. 9(*b*) shows a waveform of motor phase current for the system of FIG. 7;

FIG. 10(*b*) shows the corresponding motor phase current;

FIG. 11(*a*) shows a waveform of DC link voltage according to an embodiment;

FIG. 11(*b*) shows profiled phase current waveforms corresponding to FIG. 11(*a*);

Figure 7:
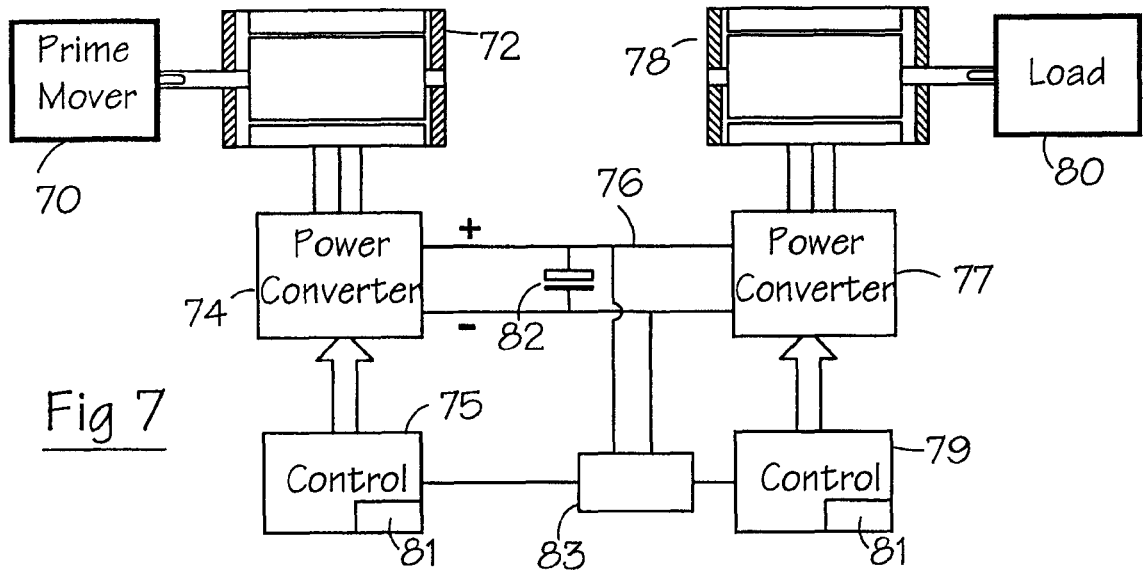
FIG. 7 shows a generating system supplying a single motor.
Figure 8:
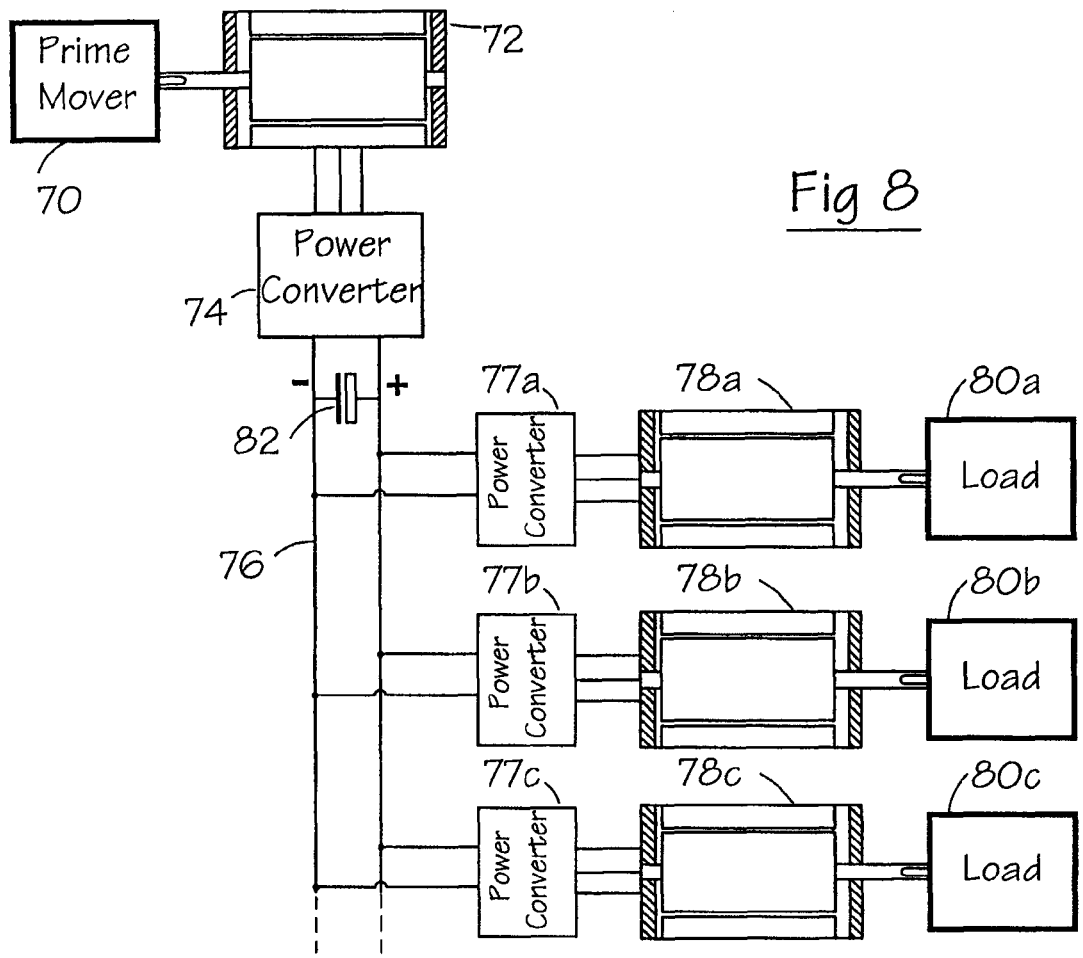
FIG. 8 shows a generating system supplying several motors.

The illustrations below refer to a system configured as shown in FIG. 7 with 3-phase machines. However, machines with any number of phases could be used in accordance with the invention and the phase number of the generator and motor(s) need not be the same. Control of the respective machines 72 and 78 is implemented in software loaded in the memory 81 of controls 75 and 79. According to their respective control algorithms the power converter switches are actuated. In this embodiment, the technique is implemented in the software. FIG. 7 also shows a monitoring device 83 which is arranged to monitor the DC link voltage. This is used for general system monitoring purposes, but is also used in relation to an embodiment disclosed herein. The monitoring device can take a number of different forms that will be known to the person of ordinary skill in the art and will not be elaborated on here.

Figure 9A:
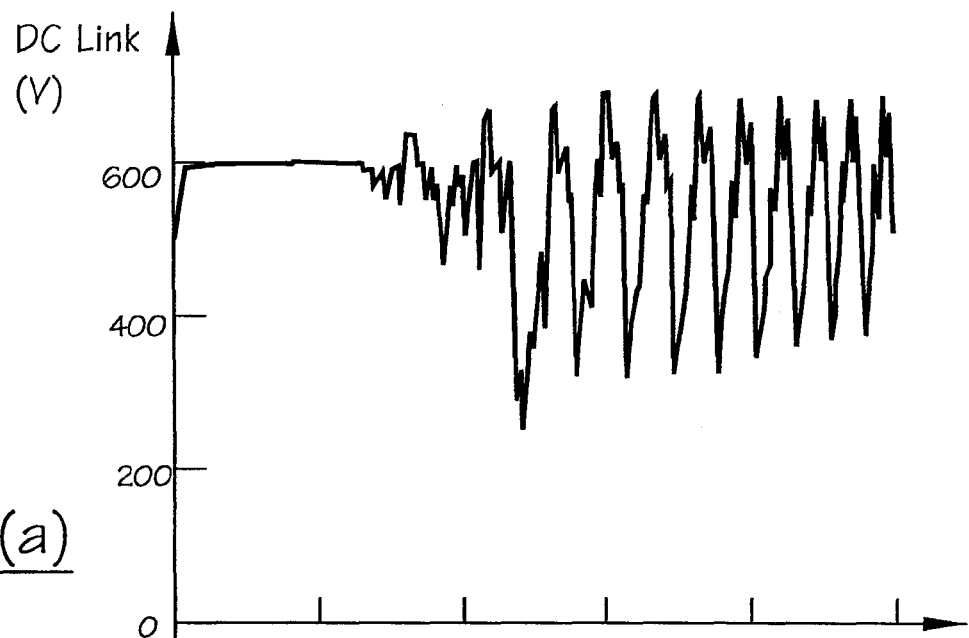
FIG. 9(*a*) shows a waveform of DC link voltage for the operation of the system of FIG. 7.
Figure 9B:
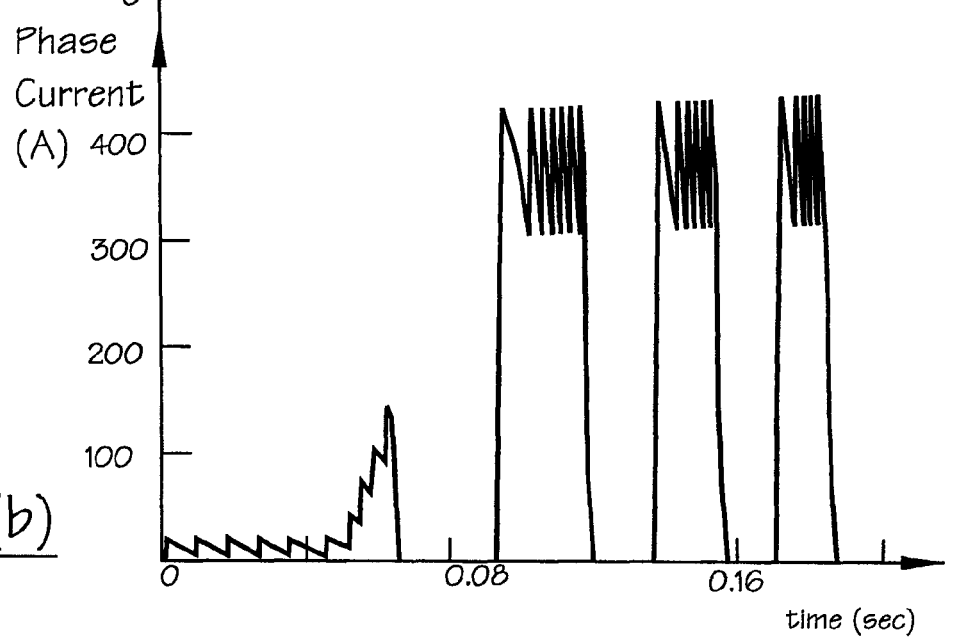

FIG. 9 shows the operating characteristics of a system as shown in FIG. 7 but which is conventionally controlled. The motor is accelerating from a very low load at low speed to full load at higher speed. This could correspond to a vehicle operating under full acceleration demand, where the demand has a ramp to avoid exciting resonances in the drive train. The DC link voltage is shown as a function of time in FIG. 9(*a*) and the current waveform for one phase of the motor is shown in FIG. 9(*b*). The other phase currents are not shown, but will be interleaved with the waveform of FIG. 9(*b*) at the appropriate spacing. In FIG. 9(*a*) it will be seen that the voltage is essentially constant until the phase current begins to rise. The large periodic dips in the voltage correspond to the switch-on point for each incoming phase of the motor, indicating that the DC link capacitor cannot supply sufficient energy to maintain the voltage. The smaller perturbations on the waveform are due to a combination of the switching of the phases in the generator (which is at a much higher frequency) and the chopping action in the phases of the motor. In this particular example, the nominal voltage of 600V dips to 250V as the motor moves the load from rest, though the system survives this and recovers to successfully accelerate the load up to speed.

Figure 10A:
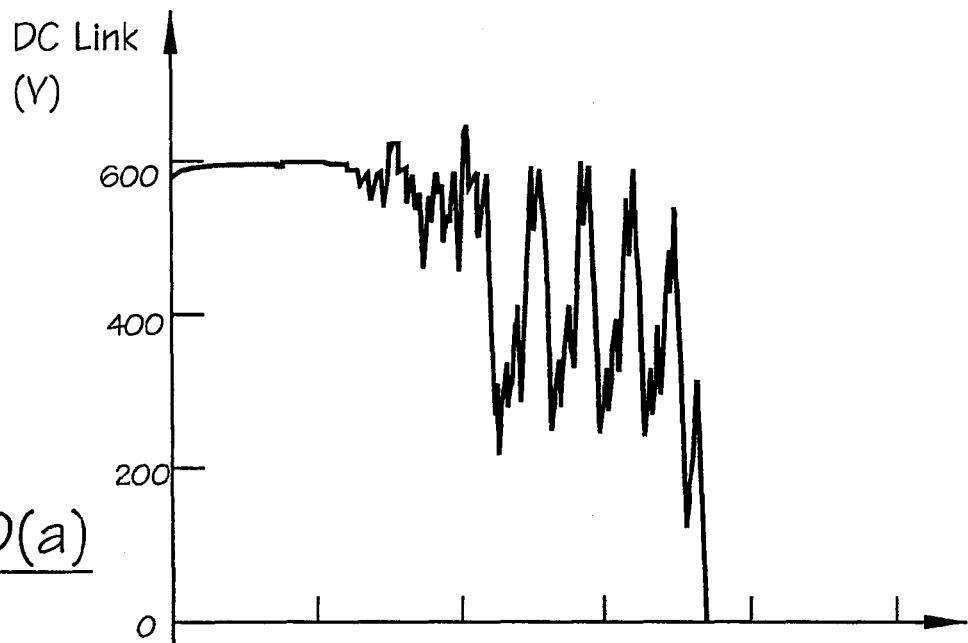
FIG. 10(*a*) shows a waveform of DC link voltage where the current demand collapses the link.
Figure 10B:
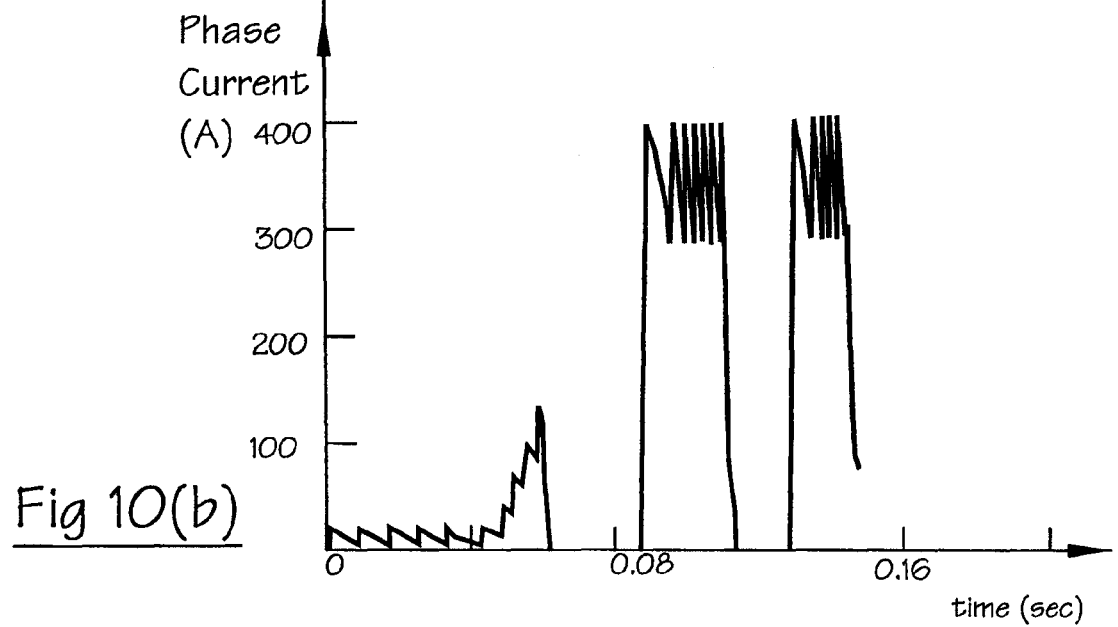

FIG. 10 shows the same system of FIG. 7 operating under slightly different conditions. The DC link voltage is shown as a function of time in FIG. 10(*a*) and the current waveform for one phase of the motor is shown in FIG. 10(*b*). In this example, the switching operations in the motor have coincided to produce a demand on the DC link that suddenly drags the voltage below the point where it is unable to supply sufficient excitation to the generator. The output of the generator fails to provide enough output to meet the system demand, so the link "stalls" to zero volts and the motor current collapses. This would represent a failure of the system to start and accelerate to the required speed. To address these stall conditions, the DC link needs to be stabilized against the random disturbances.

In a first embodiment, a predetermined profile is set for the phase currents of the motor(s) supplied by the DC link by means of the control regime implemented by the software in the memory 81 of the controllers 75 and 79. The current profile is chosen so that, when the profiled chopping currents from different phases are added, there is a greatly reduced likelihood of them combining to give the sudden demand which will provoke instability in the link voltage. FIG. 11(b) shows a suitably profiled phase current and should be compared with the conventional "square" current shape in FIG. 9(b). The current profiling can be achieved in the control software by any one of a number of known methods, e.g. by imposing angle-variable values for the upper and lower bounds of the hysteresis band, or by applying a pulse width modulation (PWM) function to the supply voltage via the phase switches. In each case, the resultant current waveform has an angle-dependent (and hence time-dependent) envelope which is characterized by a relatively slow rise at the front end and a relatively slow fall at the back end. The same profile can be applied to the other phases in the machine and to other phases of other machines operating on the same bus. The modified chopping profile is implemented in the software loaded in the control memory so that in effect a variable chopping limit is created.

FIG. 11(a) shows the resulting DC link waveform, which shows that the current profiling has the effect of reducing the amount of energy that needs to be drawn from the capacitor when the phase is switched on, and significantly reduces the voltage dip when the switch-on points of two or more phases coincide. FIG. 11(a) should be compared with FIG. 9(a), and it will be seen that, for the same peak value of phase current, the voltage dip has been reduced to less than half, thus providing a greatly enhanced stability of the link and security of system performance.

This embodiment provides a simple but effective method of stabilizing the DC link. The reduction in output applies at all times, not just when a current spike would otherwise have been produced. This will be acceptable in many situations. It will be appreciated that a variety of different current profiles could be used to equal effect.

Figure 12:
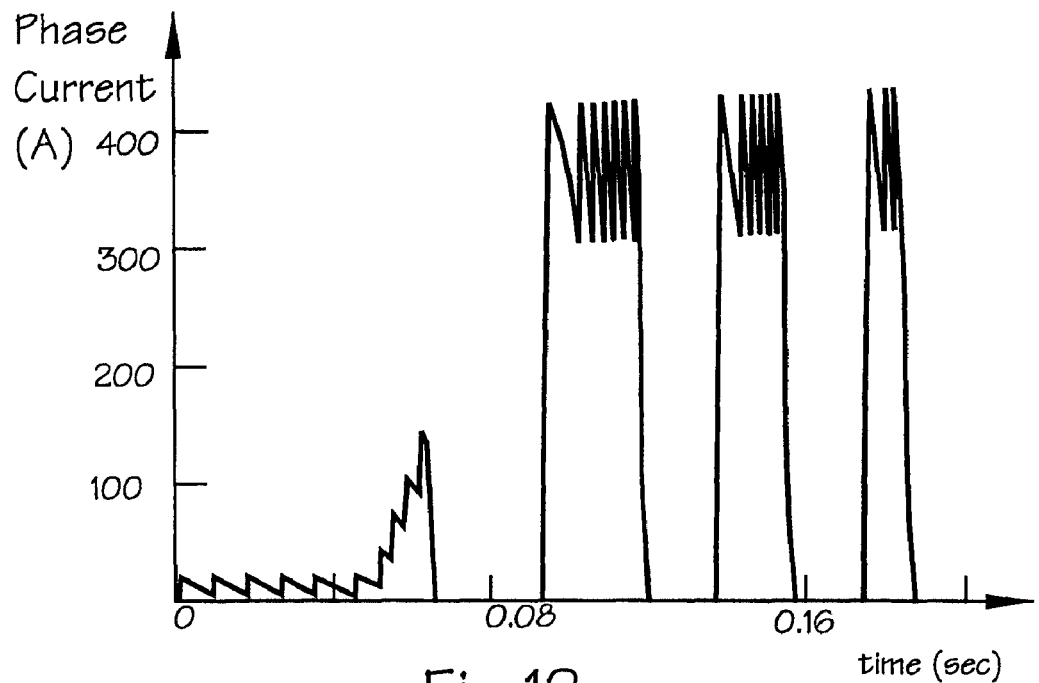
FIG. 12 shows phase current according to another embodiment.
Figure 13:
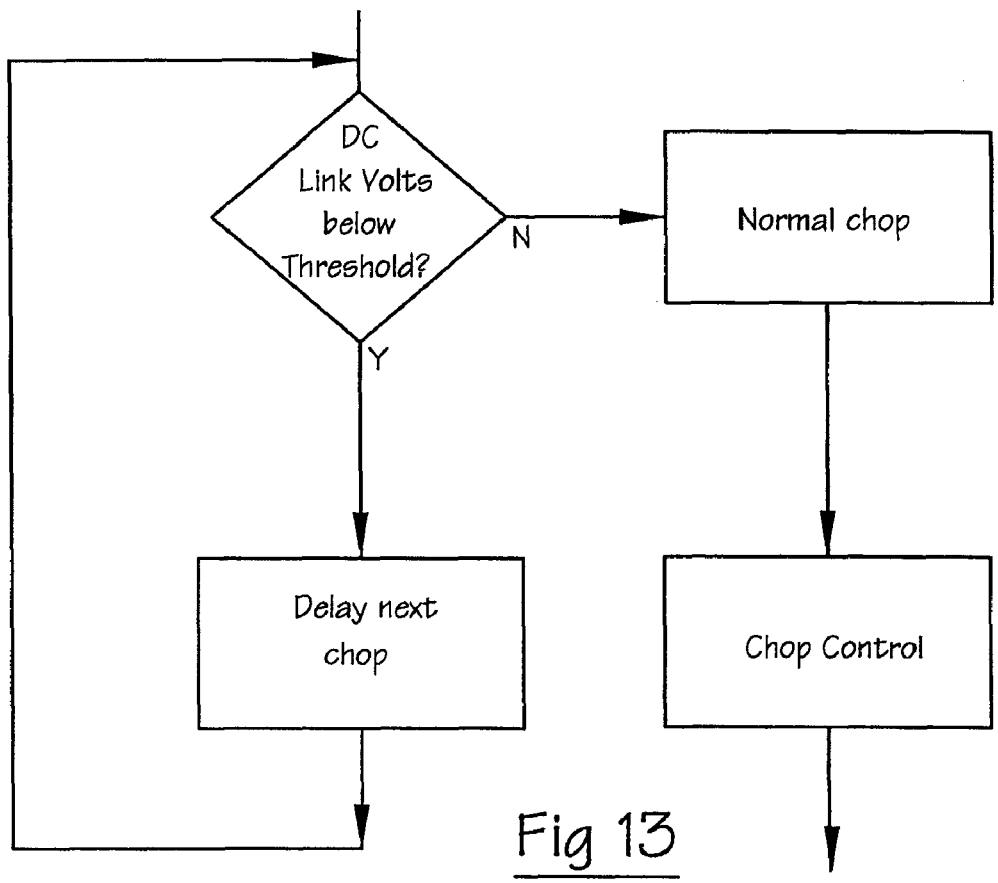
FIG. 13 shows a flow chart depicting an embodiment of the invention.

A second embodiment only shapes the currents at the moments when it is actually required. In this embodiment, the control system uses its knowledge of the instantaneous value of the DC link voltage from the monitoring device 83 in FIG. 7 and, in response to a signal from the monitoring device 83, prevents the switch-on of any phase when the voltage is dipping near to a predetermined threshold. Thus, although a rotor angle may have arrived at which a phase would have normally been switched on, the switch-on is delayed until the DC link voltage rises again and the dip, resulting from the delayed switch-on, will not present a hazard to the converter. This delay in switch-on inevitably produces a slight loss of torque, but only on a relatively small number of occasions. The current waveforms are as normal for most conduction periods with a few profiled (narrower) blocks when required. This is illustrated in FIG. 12, where the start of the third block of phase current has been delayed because of a dip in the DC link. The flow chart for implementing this embodiment is illustrated in FIG. 13.

This embodiment has the advantage that it takes no action until the stability of the DC link is threatened, thus allowing full torque to be obtained from the motor until a potentially dangerous switching action is encountered. Naturally, this requires that the bandwidth of the controller is sufficiently high to work out the potential danger and to modify the switching action(s) accordingly, but this is readily achievable with the processors currently used in such controllers.

Figure 1:
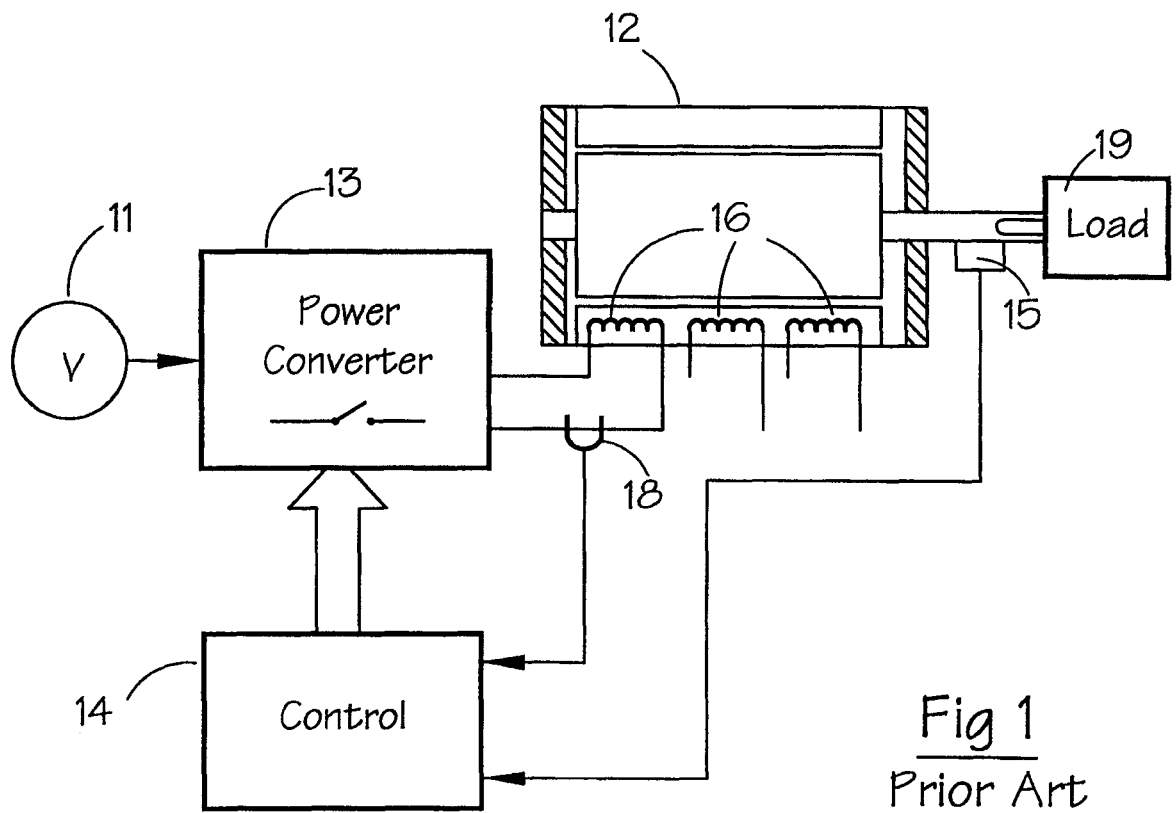
FIG. 1 is a schematic drawing of a prior art switched reluctance drive.
Figure 2:
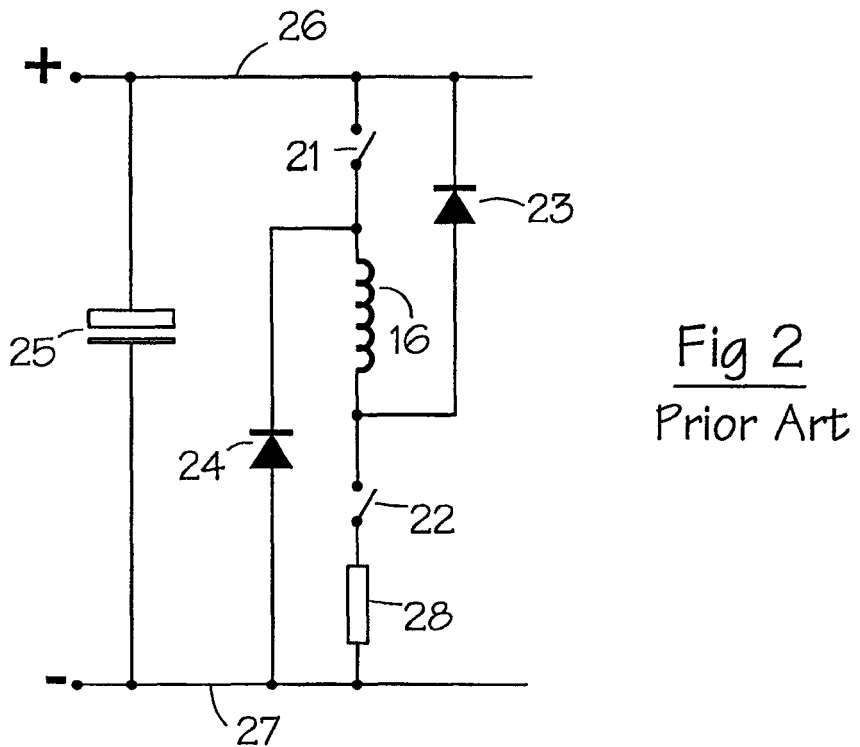
FIG. 2 is a prior art excitation circuit for the switched reluctance machine of FIG. 1.
Figure 4A:
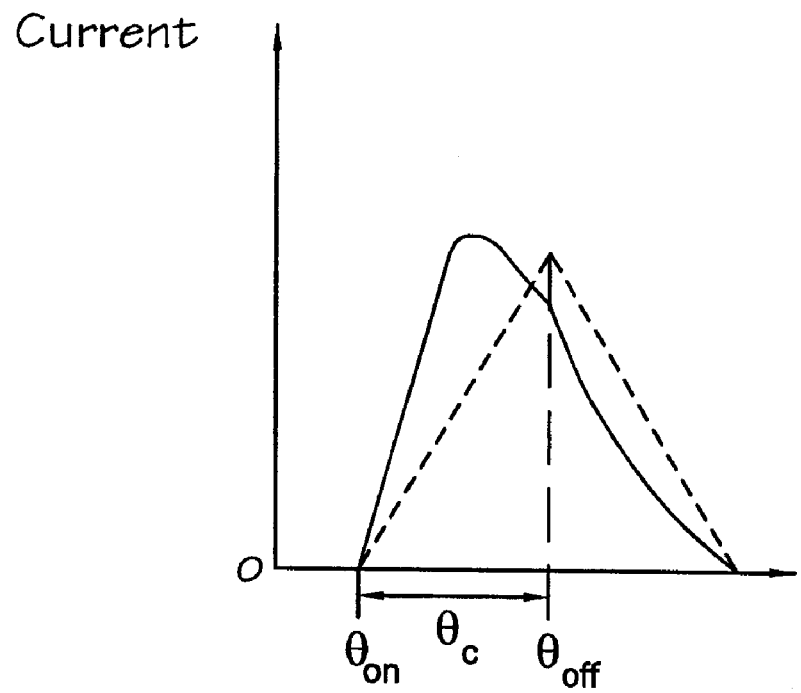
FIG. 4(*a*) shows a prior art motoring current waveform.
Figure 4B:
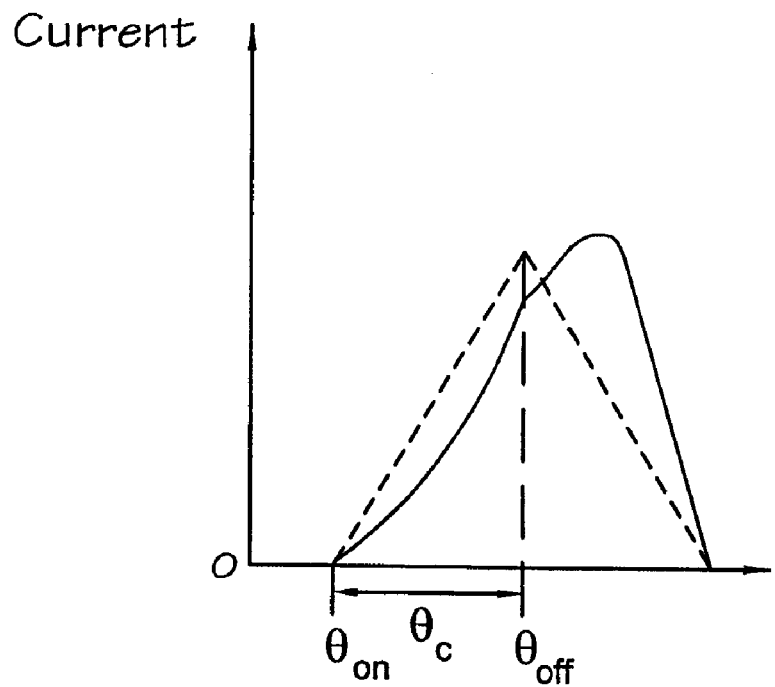
Figure 5A:
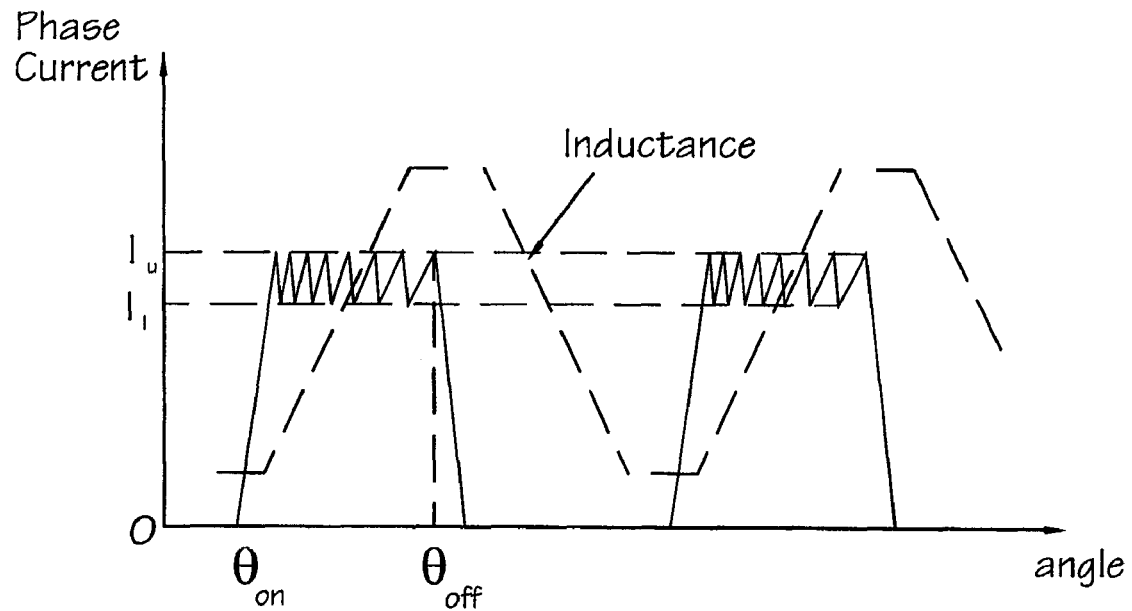
FIG. 5(*a*) shows a phase current in the chopping mode.
Figure 5B:
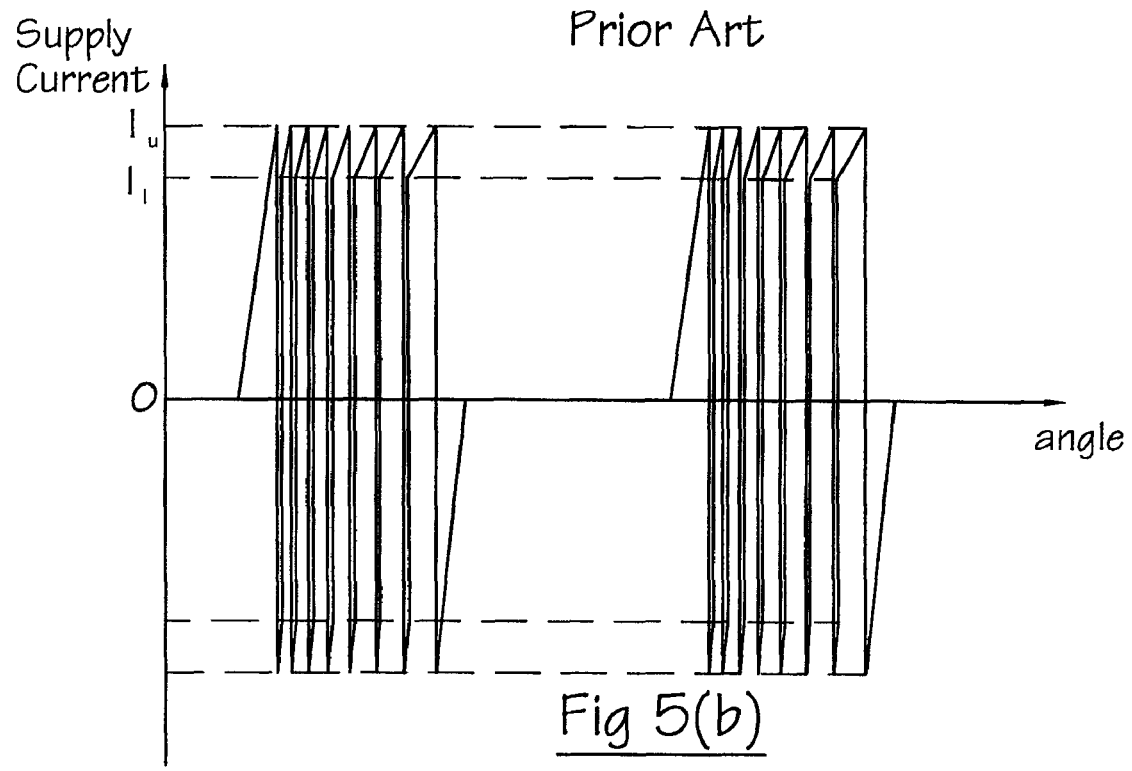
Figure 6A:
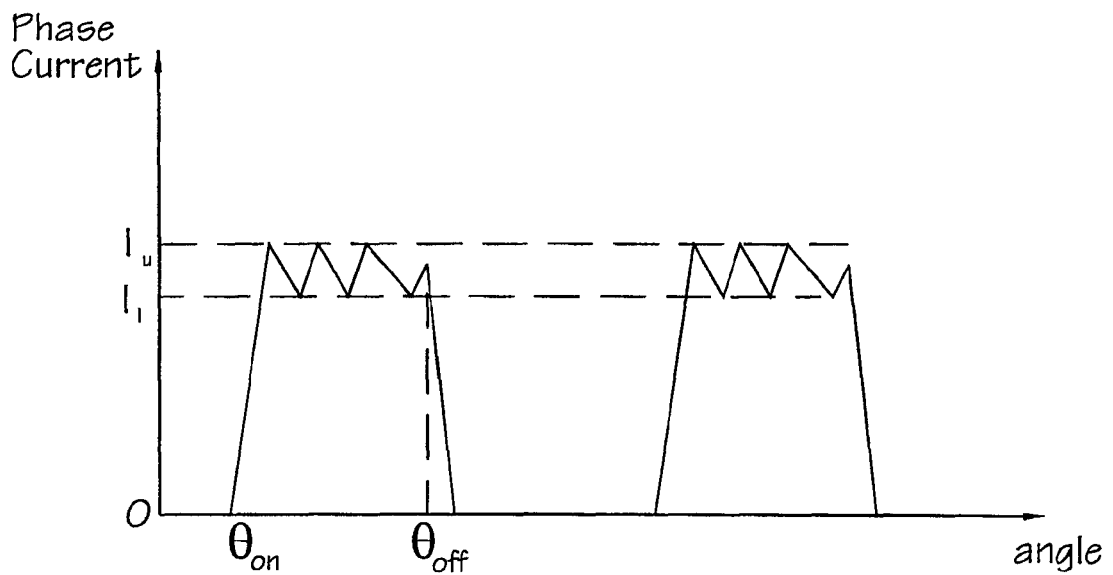
FIG. 6(*a*) shows a phase current in the chopping mode with freewheeling.
Figure 6B:
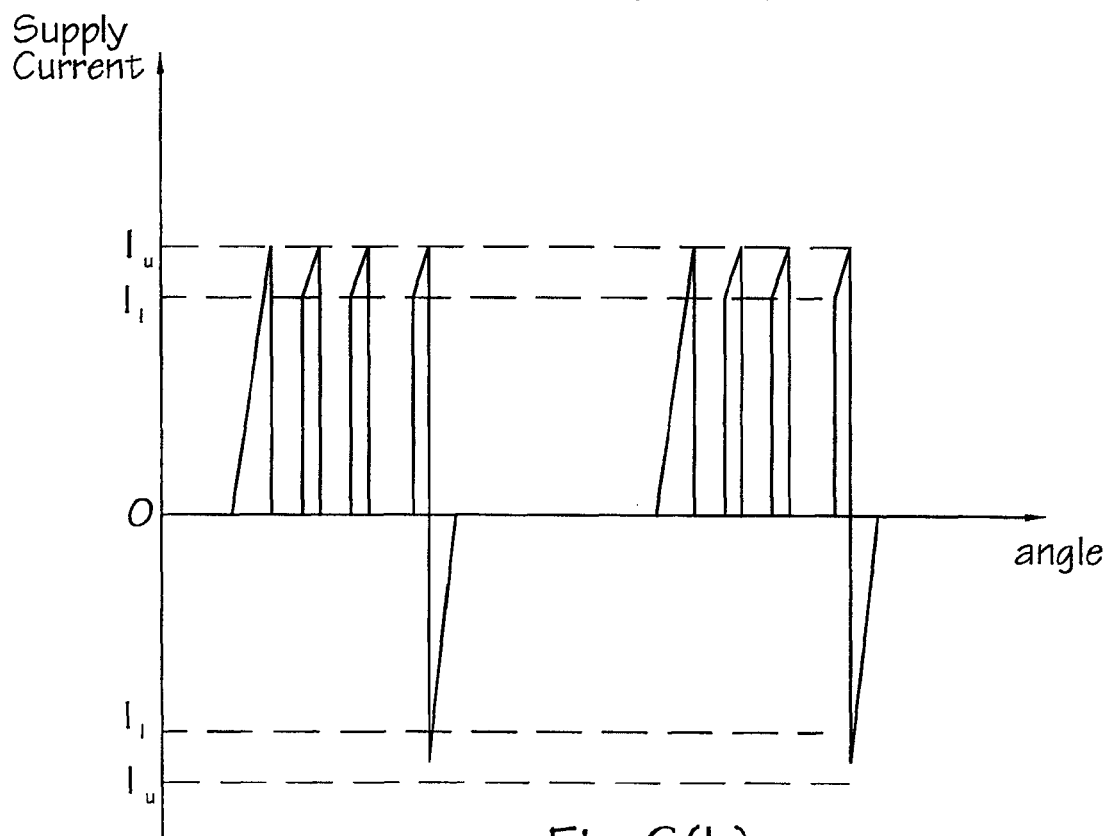
Figure 14:
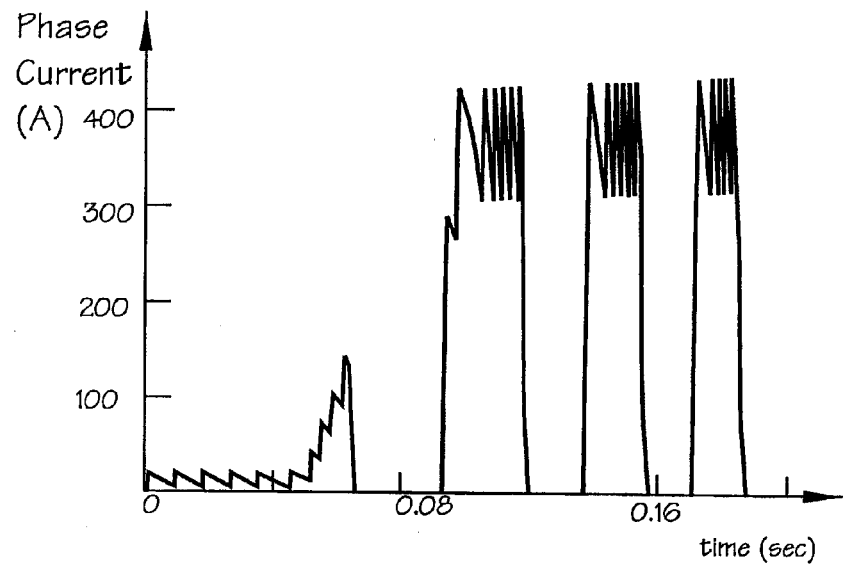
FIG. 14 shows phase current according to a yet further embodiment.
Figure 15:
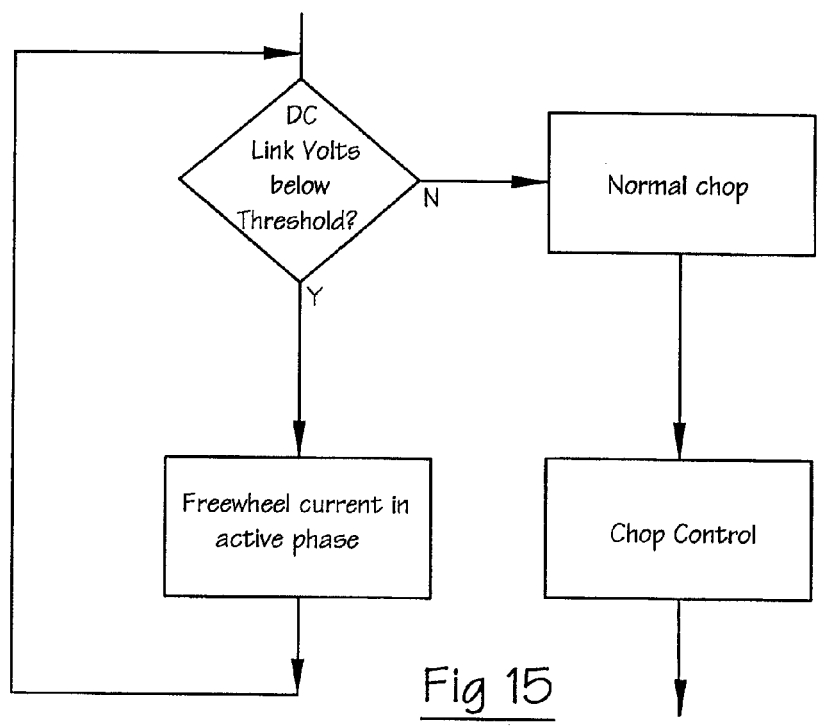
FIG. 15 shows a flow chart depicting a further embodiment of the invention.

A third embodiment, implemented in the control software, includes monitoring the DC link voltage using the monitoring device 83 as before, but does not delay the switching of any incoming phase. Instead, a predetermined DC link voltage threshold is set at a level below which operation is considered to be hazardous because the risk of the system stalling is unacceptably high. The control system monitors the DC link voltage, switching the phases as normal. When the predetermined DC link voltage threshold is reached, it forces one or more of the conducting phases into a freewheel condition by opening one of the phase switches in response to a signal from the monitoring device 83. This immediately reduces the current demand from the DC link for that phase to zero (as previously shown in FIG. 6(b)) yet maintains a significant level of current in the phase. The overall effect on the output of the motor is therefore relatively small. The control system continues to monitor the DC link voltage and, when it recovers to a value above the threshold, the phase(s) are put back into full conduction by re-closing the switch in response to a further signal from the monitoring device. Those skilled in the art will realize that a simple hysteresis band can be put around the threshold to avoid switching in and out of the stall prevention mode too frequently (commonly known as "chatter"). This is illustrated in FIG. 14, where the control system has sensed a voltage dip as the first full block of phase conduction has begun, and a period of freewheeling has been inserted in the rising edge of the block to allow the DC link to recover. The flow chart for implementing this embodiment is illustrated in FIG. 15.

This embodiment has the advantage that no action is taken until absolutely necessary, and even then the impact on the motor output is small, while the DC link is held in a stable and safe condition at all times. Effectively, this embodiment makes full use of the capacitance in the DC link by maintaining it at or just above the point of instability during conditions of high demand. Because of this, the capacitance on the link can be reduced to levels below that normally considered safe, so that a more economical system can be produced. The threshold voltage is predetermined, taking account of such factors as the number of machines in the system, the size of the generator relative to the motors, the speeds of the machines and their coupled inertias, the amount of capacitance, the reliability required from the system, etc. In one system operating on a nominal 650V bus, a threshold voltage of 320V is chosen, with a hysteresis band of 30V sitting above the 320V.

An alternative version of the above embodiment is to detect when the voltage threshold has been reached and then to put the phase(s) into full energy return by opening both phase switches. While this will force the flux and current down at a much faster rate and hence reduce the torque of the machine more, it has the benefit that the current being returned to the DC link will assist in recovering from the voltage dip. The system designer can therefore choose between the freewheel method giving smoother torque or the energy return method giving faster recovery. It is possible to combine these two variants to firstly put the phase(s) into freewheeling in the expectation that the voltage will recover, but secondly put the phase(s) into energy return if the recovery does not take place within a predetermined time. This predetermined time will be set principally in relation to the generator phase conduction period, which, for a machine with 12 rotor poles operating at 2000 rev/min, will typically be of the order of 2.5 msec.

The above embodiments have been illustrated with switched reluctance machines, but the invention is not restricted to them. It can be used with any electrical machine where there is control over the point at which voltage is applied to the phase windings, for example, electronically controlled synchronous or induction machines, brushless DC machines, etc. Also, the method and system of the invention can be applied to a mixture of electrical machine types, all, some or only one of which may be susceptible to the operating techniques disclosed herein. The operating technique of controlling the phase current can be applied to at least one phase of at least one of the electrical machines contributing to the combined load on the DC link. It will be clear to the skilled person having the benefit of this disclosure that the invention could be applied also to systems which are supplied not from a generator but from an alternating or direct supply which has high source impedance. Such a supply will exhibit characteristics similar to those described in detail above for a generator, so will benefit equally from use of the invention.

Embodiments include the computer program product stored on a computer readable medium as used in the system controllers. The medium may be solid state memory or other storage device enabling processing for controlling the machine to implement the control regime according to the disclosed embodiments. The controller may be a general purpose processor or other computer means running under the command of the program. Equally well, the embodiments can use a dedicated device, such as an application specific integrated circuit (ASIC).

The skilled person will appreciate that variation of the disclosed arrangements are possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

What is claimed is:

1. A computer readable storage medium storing a non-transitory computer program that, when executed by a computer, causes the computer to perform a process comprising: monitoring an electrical signal that is a DC link voltage of a DC link used to operate a plurality of electrical machines that each have at least one phase winding; and
   responding to said DC link voltage decreasing to a predetermined threshold by controlling current in a subset of said phase windings in a manner modifying a current in said DC link so as to control the magnitude of disturbances in said DC link voltage caused by a combined load of said plurality of electrical machines, said controlling the current including causing a profile of said current in each said phase winding of said subset to be dependent on at least one of time and angle.

2. The computer readable storage medium according to claim 1, wherein said controlling said current in each said phase winding of said subset is performed in a manner that includes chopping, and that includes said causing the profile of said current in each said phase winding of said subset to be dependent on time.

3. The computer readable storage medium according to claim 1, wherein said controlling said current in each said phase winding of said subset is performed in a manner that includes chopping, and that includes said causing the profile of said current in each said phase winding of said subset to be dependent on angle.

4. The computer readable storage medium according to claim 1, wherein said controlling said current is performed in a manner that includes causing the profile of said current in each said phase winding of said subset to have a relatively slow rise and a relatively slow fall.

5. A computer readable storage medium storing a non-transitory computer program that, when executed by a computer, causes the computer to perform a process comprising:
   monitoring an electrical signal that is a DC link voltage of a DC link used to operate a plurality of electrical machines that each have at least one phase winding; and
   responding to said DC link voltage decreasing to a predetermined threshold by controlling current in a subset of said phase windings in a manner modifying a current in said DC link so as to control the magnitude of disturbances in said DC link voltage caused by a combined load of said plurality of electrical machines, said controlling the current including freewheeling the current in at least one said phase winding of one of said electrical machines that is a switched reluctance machine.

6. The computer readable storage medium according to claim 5, wherein said controlling said current is performed in a manner that includes returning current from said phase winding of said one of said electrical machines to said DC link if said DC link voltage has not recovered after said freewheeling has been carried out for a predetermined period.

7. The computer readable storage medium according to claim 5, wherein said controlling said current is performed in a manner that includes performing said freewheeling in each said phase winding of said subset, and that includes returning current from each said phase winding of said subset to said DC link if said DC link voltage has not recovered after said freewheeling has been carried out for a predetermined period.

8. The computer readable storage medium according to claim 5, wherein said controlling said current in each said phase winding of said subset is performed in a manner that includes chopping.

9. A computer readable storage medium storing a non-transitory computer program that, when executed by a computer, causes the computer to perform a process comprising:
   monitoring an electrical signal that is a DC link voltage of a DC link used to operate a plurality of electrical machines that each have at least one phase winding; and
   responding to said DC link voltage decreasing to a predetermined threshold by controlling current in a subset of said phase windings in a manner modifying a current in said DC link so as to control the magnitude of disturbances in said DC link voltage caused by a combined load of said plurality of electrical machines, said controlling the current including returning current to said DC link from at least one said phase winding of one of said electrical machines that is a switched reluctance machine.

10. The computer readable storage medium according to claim 9, wherein said controlling said current is performed in a manner that includes freewheeling the current in said phase winding of said one of said electrical machines, and that includes performing said returning current when said DC link voltage has not recovered after said freewheeling has been carried out for a predetermined period.

11. The computer readable storage medium according to claim 9, wherein said controlling said current is performed in a manner that includes freewheeling the current in each said phase winding of said subset, and that includes performing said returning current from each said phase winding of said subset when said DC link voltage has not recovered after said freewheeling has been carried out for a predetermined period.

12. The computer readable storage medium according to claim 9, wherein said controlling said current in each said phase winding of said subset is performed in a manner that includes chopping.

* * * * *